United States Patent
Needham et al.

[11] Patent Number: 5,963,371
[45] Date of Patent: Oct. 5, 1999

[54] METHOD OF DISPLAYING PRIVATE DATA TO COLLOCATED USERS

[75] Inventors: Bradford H Needham, Hillsboro; David H Koizumi, Portland, both of Oreg.

[73] Assignee: Intel Corporation, Santa Clara, Calif.

[21] Appl. No.: 09/018,390

[22] Filed: Feb. 4, 1998

[51] Int. Cl.$^6$ ............................ G02B 27/22; G02B 27/26
[52] U.S. Cl. .................... 359/464; 359/466; 359/465; 359/462
[58] Field of Search ............................ 359/466, 464, 359/465, 462; 351/41, 44, 45, 49, 242, 237, 239, 240, 246; 472/61; 382/165; 434/44

[56] References Cited

U.S. PATENT DOCUMENTS

| | | | |
|---|---|---|---|
| 4,134,644 | 1/1979 | Marks et al. | 359/466 |
| 4,559,556 | 12/1985 | Wilkins | 359/465 |
| 5,137,450 | 8/1992 | Thomas | 434/44 |
| 5,602,603 | 2/1997 | Bondet | 351/44 |
| 5,821,989 | 10/1998 | Lazzaro et al. | 359/465 |

OTHER PUBLICATIONS

Lipton, Lenny, "Stereo–Vision Formats for Video and Computer Graphics", StereoGraphics Corporation, 1996–97, 9 pages.

Schechter, Joanne, "Update your Thinking of Stereoscopic Displays", *CGW Magazine*, Sep. 1997, 6 pages.

*Primary Examiner*—Cassandra Spyrou
*Assistant Examiner*—Jennifer Winstedt
*Attorney, Agent, or Firm*—Steven P. Skabrat

[57] ABSTRACT

Displaying data private to a first user and data private to a second, collocated user on a single computer display is achieved by providing two pairs of stereoscopic glasses, one for each user, and modifying the glasses by swapping one of the lens from the first pair with one of the lens of the second pair so that the modified first pair of glasses allows viewing of the display in a first state and the modified second pair of glasses allows viewing of the display in a second state. The data private to the first user is displayed when the display is in the first state and the data private to the second user is displayed when the display is in the second state. The display is alternately switched between the first and second states many times per second, thereby providing private displays for each user. In one embodiment, the stereoscopic glasses are polarized glasses and the display includes a polarizing filter. In another embodiment, the stereoscopic glasses are shutter glasses. In yet another embodiment, the stereoscopic glasses are colored glasses for viewing a composite image of the data private to each, with specialized colors used to ensure privacy of the display.

17 Claims, 9 Drawing Sheets

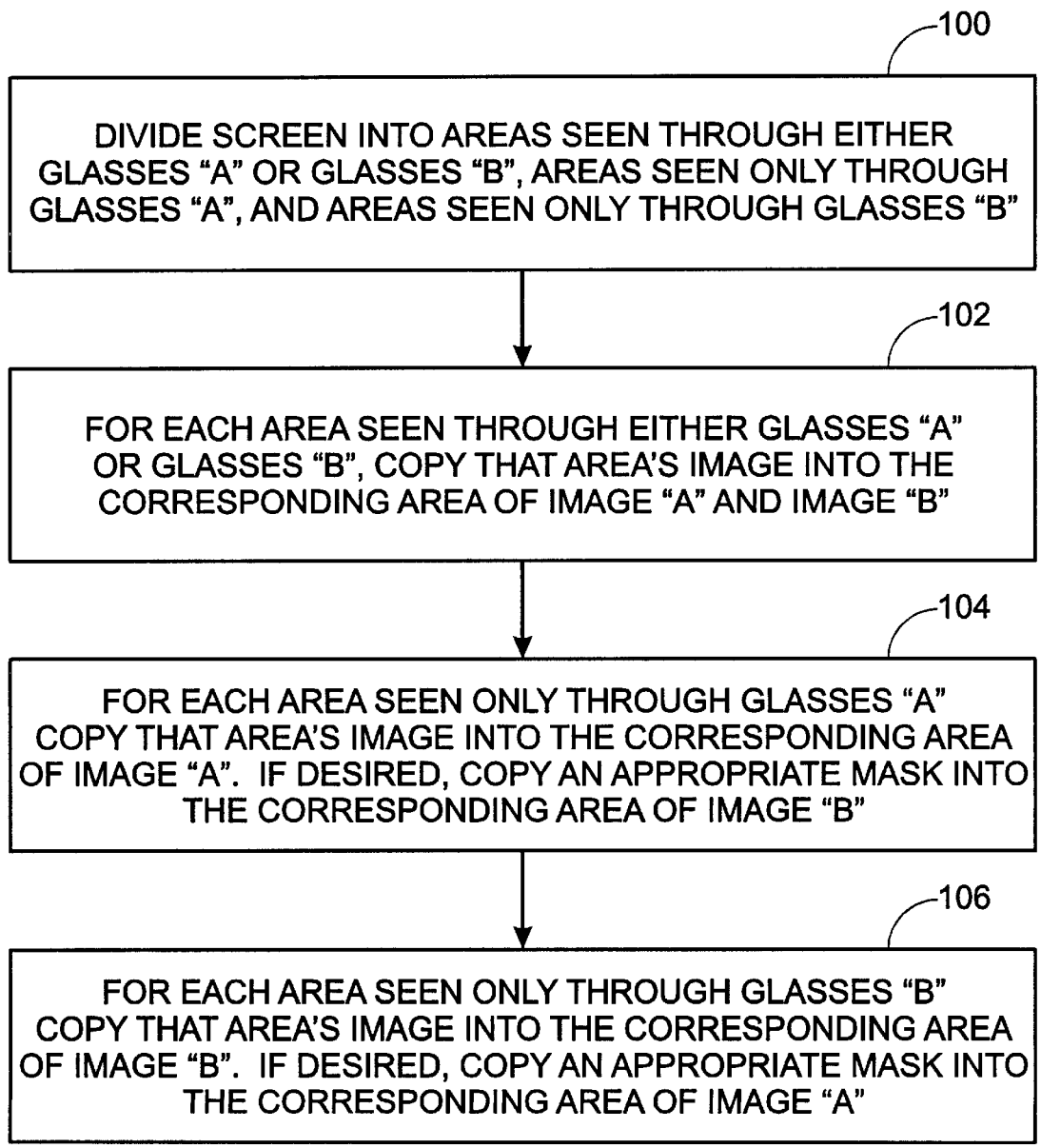

METHOD OF DISPLAYING PRIVATE DATA TO COLLOCATED USERS

BACKGROUND OF THE INVENTION

1. Field of the Invention

The present invention relates generally to user interfaces for computer systems and more specifically to displaying data that is private to a first user which cannot be seen by a second, collocated user.

2. Description of Related Art

In collocated, multi-user computer-based applications, two or more people use a single computer simultaneously in the same room. Although personal computers (PCs) easily support multiple simultaneous input devices (e.g., multiple joysticks or game pads), they do not easily support separate displays for each user. Currently, the only way to provide separate displays to different users in the same room is to provide a separate physical display to each user. This solution has two drawbacks. The first drawback is that providing separate displays for each user is more expensive than providing a single, interleaved display. The second drawback is that separate displays increase the psychological distance between the users. Instead of the users attending to the single display of a game or other application, each user attends to their own display, making it difficult, for example, for one user to understand what the other user is pointing at. The lack of support and high cost for private displays eliminates the widespread use of the class of collocated games or other applications where one user is shown private information that the other user should not see (for example, a user's hand of cards in a card game).

FIG. 1 shows a prior art display of an example collocated, multi-user computer-based game. In this example of a crossword-building game, the tiles 10 at the top of the figure belong to Player A, and the tiles 12 at the bottom belong to Player B. In a conventional computer display, both players see each other's tiles because the computer display 16 always shows the game board 14, Player A's tiles 10, and Player B's tiles 12. This ruins the game for the players. Similar outcomes occur in card games or other applications where one user needs to hide displayed information from another user. What is desired is a system having a single computer display which can, for example, show Player A only the public information such as game board 14 and Player A's private information, such as tiles 10, and can simultaneously show Player B only the public information and Player B's private information, such as tiles 12. More generally, a system having one computer display is desired whereby each one of multiple users can view information accessible to all users as well as private information accessible to only a single user. Such a system would be useful for collocated multi-user computer applications such as games or training exercises, as well as single user computer applications where the user desires privacy to exclude bystanders from obtaining the displayed information.

SUMMARY OF THE INVENTION

An embodiment of the present invention is a method of displaying data private to a first user and data private to a second, collocated user on a display. The method includes the steps of providing two pairs of stereoscopic glasses, a first pair for use by the first user and a second pair for use by the second user, modifying the first pair of stereoscopic glasses to allow viewing of the display in a first state and modifying the second pair of stereoscopic glasses to allow viewing of the display in a second state, displaying data private to the first user on the display during the first state, displaying data private to the second user on the display during the second state, and alternately switching between the first and second states.

BRIEF DESCRIPTION OF THE DRAWINGS

The features and advantages of the present invention will become apparent from the following detailed description of the present invention in which:

FIG. 7 is a flow diagram of the method for generating images according to an embodiment of the present invention;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 2:
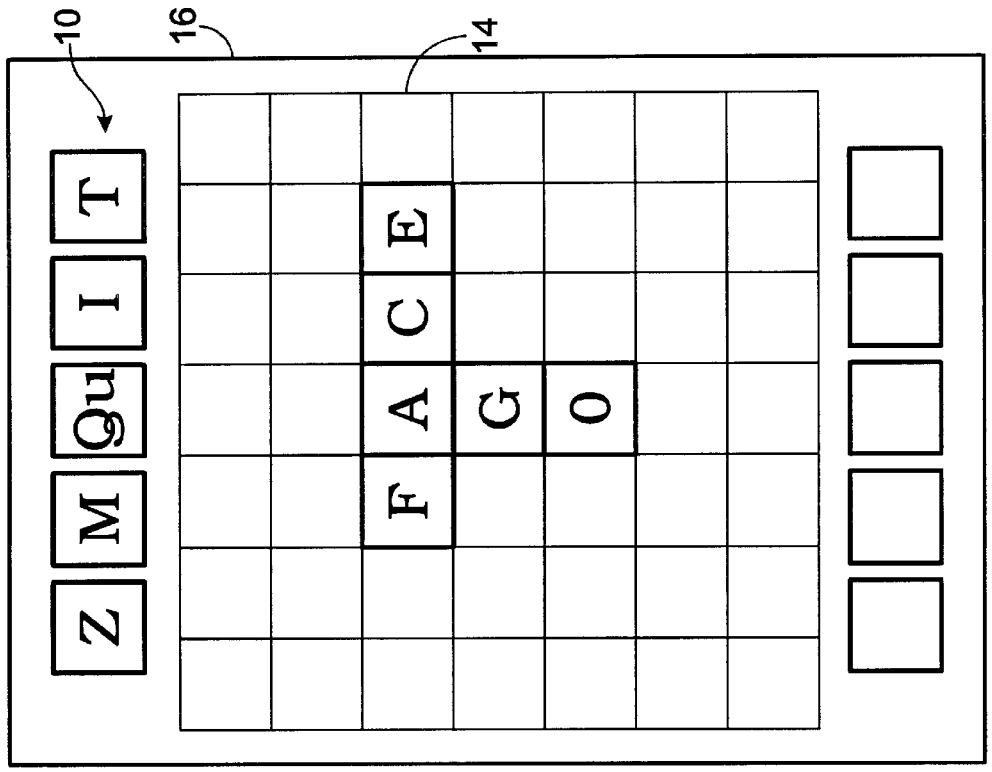
FIG. 2 is a diagram showing a first player's private information of the example game and public information.
Figure 1:
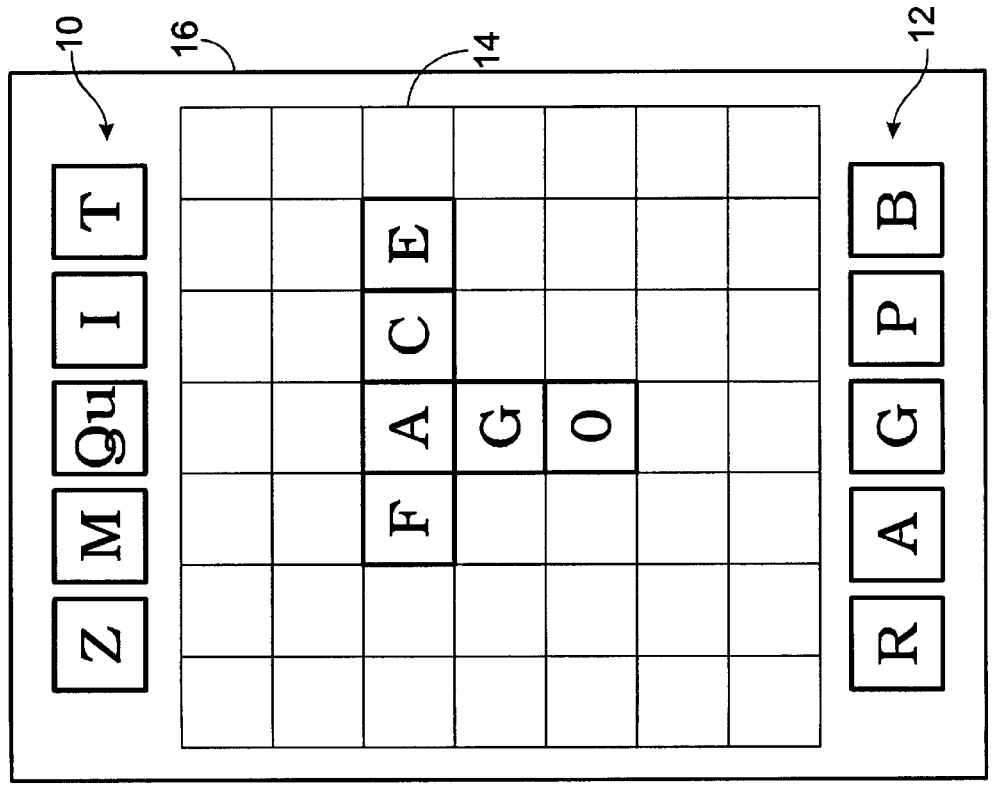
FIG. 1 is a diagram showing a prior art display of an example collocated, multi-user computer-based game.

The present invention eliminates the problems of the prior art by using a single display device and time-multiplexing or color-mixing each user's display on the same physical device. Users can easily point to parts of the display that are common to all users and can quickly switch their attention from their private information on the display to the public information on the same screen. Thus, the present invention provides private displays to multiple users of a single computer display. Referring to the example of FIG. 1, an embodiment of the present invention displays the game board 14 (public information) and Player A's tiles 10 (information private to Player A) on the computer display in such a manner as to be only visible by Player A. The display components visible to Player A are shown in FIG. 2.

Figure 3:
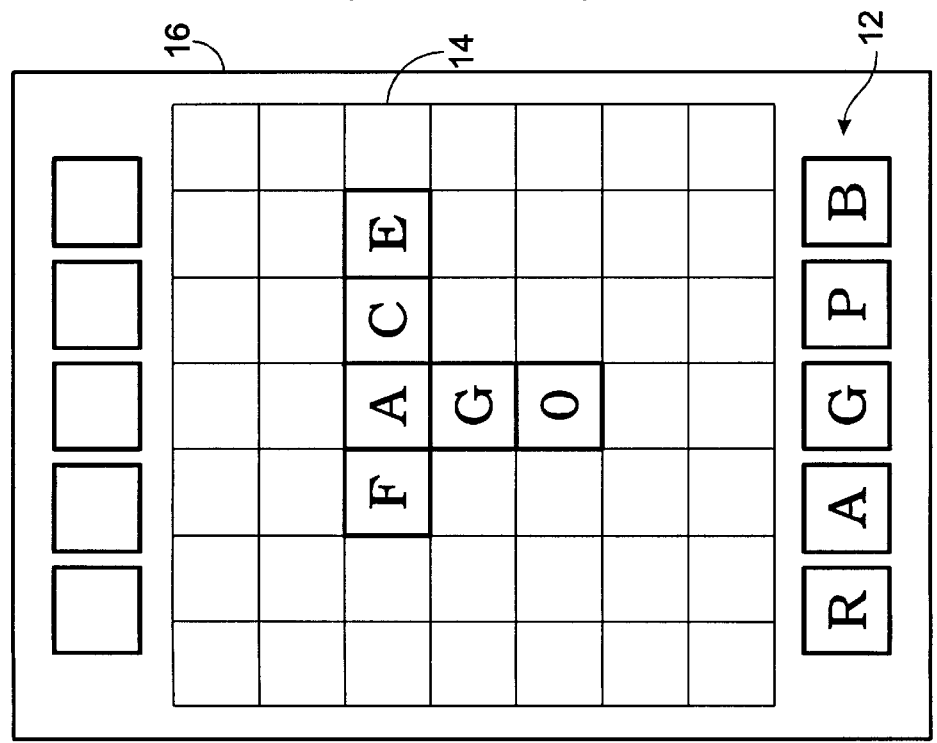
FIG. 3 is a diagram showing a second player's private information of the example game and public information.

Similarly, the present invention displays the game board and Player B's tiles 12 (information private to Player B) on the computer display in such a manner as to be only visible to Player B. The display components visible to Player B are shown in FIG. 3.

In some embodiments, the present invention modifies existing hardware techniques of active field-sequential stereoscopic displays so that instead of displaying distinct images to the right eye and to the left eye of each user, the system displays distinct images to "Person A" and "Person B". Although the description detailed herein is presented in terms of two simultaneous users, the concepts discussed herein may also be expanded to more than two simultaneous users by those skilled in the art. There are three known stereo display techniques which can be modified according to the present invention: polarized glasses viewing a changing filter over the display, shutter glasses (also known as "toggle goggles") synchronized to the display, and colored glasses.

Figure 4:
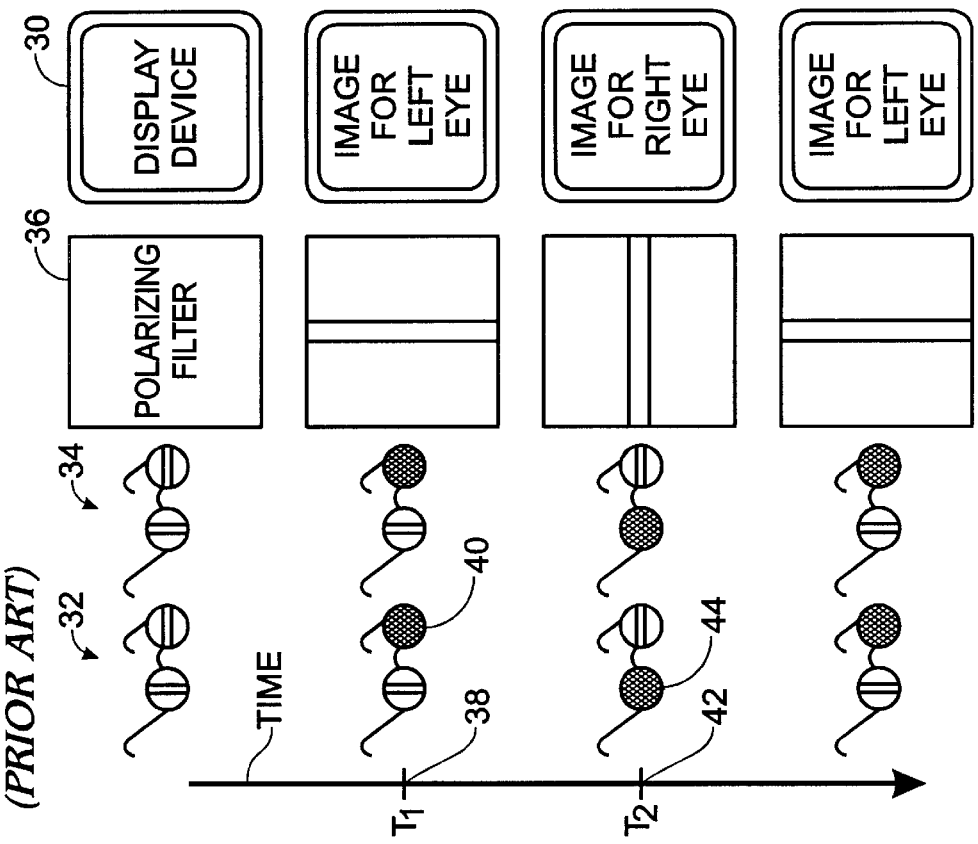
FIG. 4 illustrates the use of polarized glasses to obtain a stereo display (Prior Art)

One embodiment of the present invention uses polarized glasses. FIG. 4 shows the existing use of polarized glasses for stereo viewing. The display device 30 is viewed through at least one pair of polarized glasses 32. In this example, another pair of polarized glasses 34 is also shown. The left lenses of both pairs of glasses are vertically oriented, while the right lenses are horizontally oriented (or vice versa). The lenses are set to block light that is polarized in one direction and to pass light that is polarized in the opposite direction. A high speed liquid crystal display (LCD) polarizing filter 36 is placed over the display. The LCD polarizing filter alternates polarity such that the display intended for the left eye is polarized in one direction (referred to as 'vertical') while the display intended for the right eye is polarized in the opposite direction (referred to as 'horizontal') (or vice versa). The polarity of the filter 36 is changed alternately vertically and horizontally in synchrony with the display device such that when the display device 30 shows the image for the left eye's view at time $t_1$ 38, the right lens 40 blocks the display, and when the display device shows the image for the right eye's view at time $t_2$ 42, the left lens 44 blocks the display. As time progresses and the images are switched at a high rate (e.g., 120 times per second), the user wearing the polarizing glasses appears to see a stereo display on the display device 30. Such polarizing glasses and filters are well known in the art. A stereoscopic viewing panel with a high speed liquid crystal modulator operating as a polarizing filter and polarized viewing glasses which work in this embodiment of the present invention are commercially available as the 17SX and 21SX stereoscopic display kits from NuVision Technologies, Inc. of Beaverton, Oreg.

Figure 5:
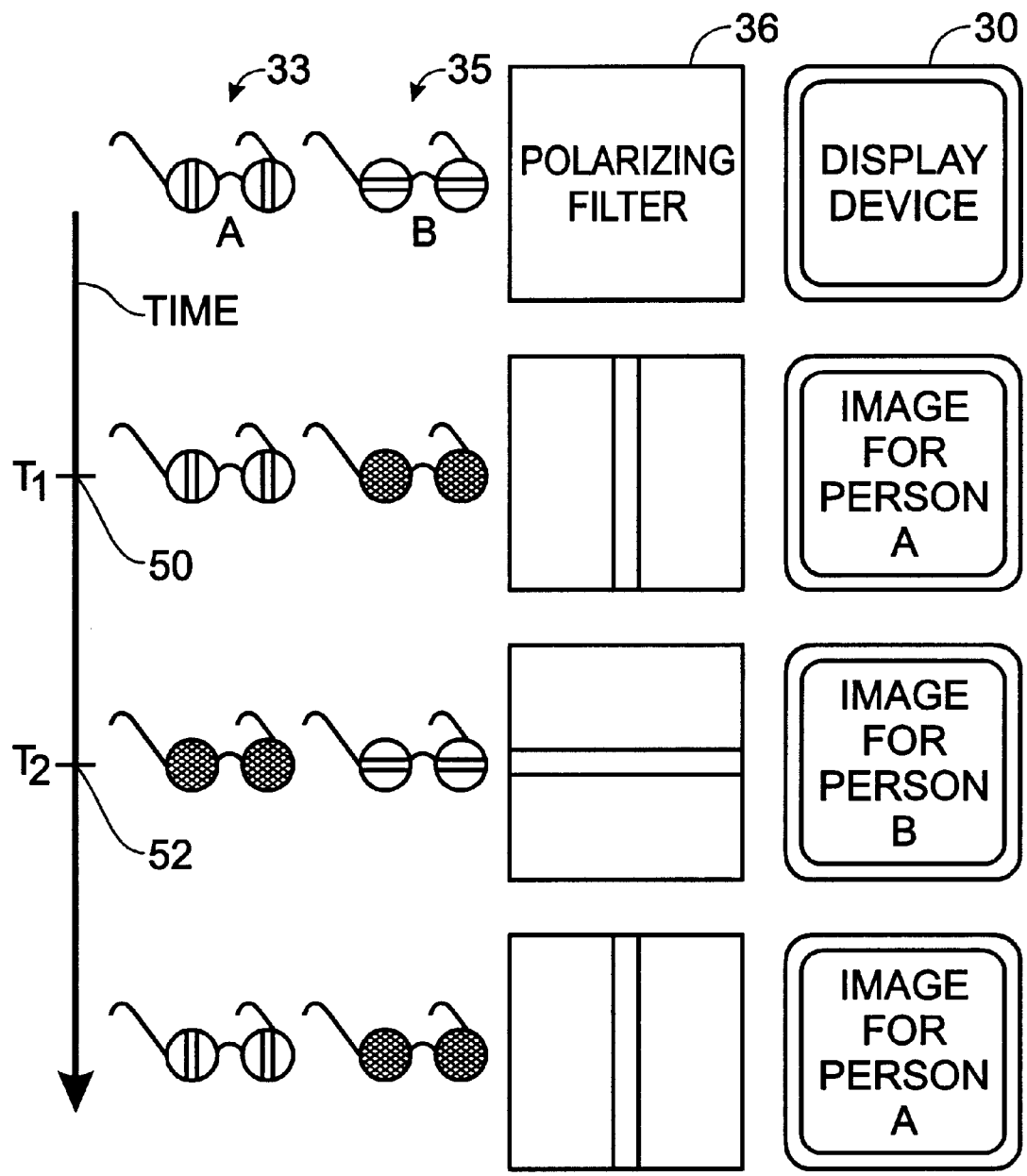
FIG. 5 illustrates the use of polarized glasses according to an embodiment of the present invention.

FIG. 5 shows the polarized glasses and filter system, changed according to an embodiment of the present invention, so that Person A's left and right glasses 33 block the display simultaneously (instead of alternating) and alternate with Person B's left and right glasses 35 blocking the display. The right lens of the first pair of polarized glasses 33 is swapped with the left lens of the second pair of polarized glasses 35 such that Person A now sees only vertically polarized displays and Person B sees only horizontally polarized displays (or vice versa). Now, at time $t_1$ 50 the display device 30 shows the image for viewing by Person A through left and right glasses 33 while Person B's glasses 35 block the display because polarizing filter 36 is set to vertical polarization. At time $t_2$ 52, the display device shows the image for viewing by Person B through left and right glasses 35 while Person A's glasses 33 block the display because polarizing filter 36 is set to horizontal polarization. As time progresses and the images and polarization are switched at a high rate, Person A sees one set of displayed information and Person B sees another set of information. In this way, separate displays are shown to two users using a single physical display.

Figure 6A:
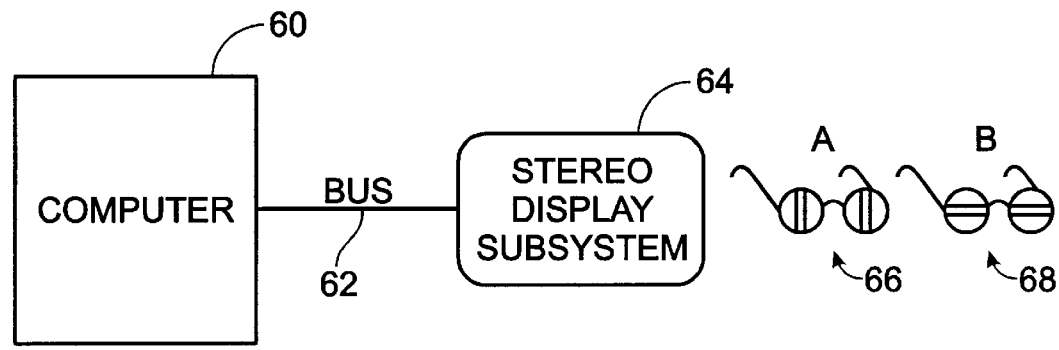
FIGS. 6a and 6b are diagrams of an embodiment of the present invention using polarized glasses and a polarized filter.
Figure 6B:
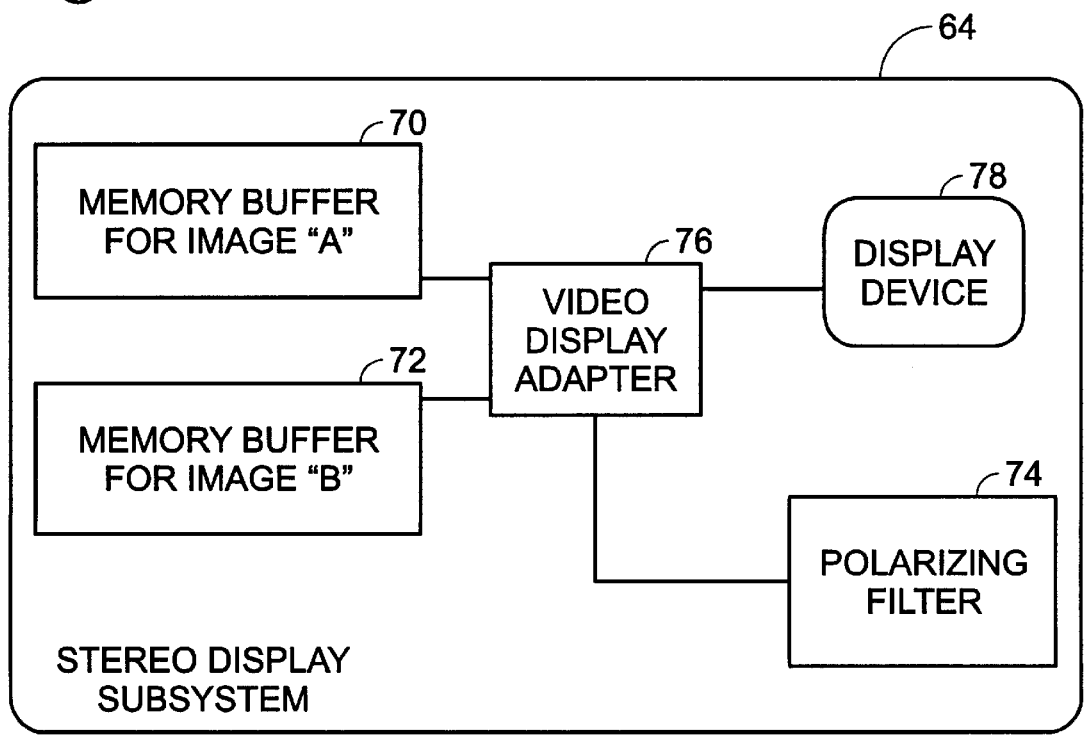

FIGS. 6*a* and 6*b* are diagrams of an embodiment of the present invention using polarized glasses and a polarizing filter. A computer 60 is coupled by a bus 62 to a stereo display subsystem 64. The computer may be any general purpose digital computer such as a personal computer (PC). The two pairs of polarized glasses 66, 68 are polarized such that the lenses in pair "A" 66 are both polarized in one direction and the lenses in pair "B" 68 are both polarized in the opposite direction. This arrangement is different than the conventional arrangement, which has the left lenses of both pairs of glasses being polarized in one direction and the right lenses of both pairs of glasses being polarized in the opposite direction.

Stereo display subsystem 64 employs a memory buffer for image "A" 70 and a memory buffer for image "B" 72, and a polarizing filter 74. The stereo display subsystem may contain separate memory for image "A" and image "B", or the memory for those images may be interleaved in various ways known in the art (for example, some systems may interleave image "A" and image "B" on alternating scan lines or alternate image data in blocks). The memory buffers store the display data for the separate images for Person A and Person B. Each image includes private information and may also include public information. Image "A" is seen only by the person wearing the pair of glasses for A 66, and image "B" is seen only by the person wearing the pair of glasses for B 68. This arrangement differs from conventional use, in which image "A" corresponds to the left eye of the person wearing either pair of glasses and image "B" corresponds to the right eye of the same person.

The video display adapter 76 drives the display device 78 and controls the state of polarizing filter 74. The video display adapter interacts with a computer program (not shown) executing on computer 60.

The computer program running on the computer creates images "A" and "B" and transfers them to the stereo display subsystem 64. The stereo display subsystem controls the display device and polarizing filter so that image "A" is displayed while the polarizing filter is polarized in one direction and image "B" is displayed while the polarizing filter is polarized in the opposite direction. The computer program causes the stereo display subsystem to alternately display image "A" with the appropriate setting for the polarizing filter and image "B" with the opposite setting for the polarizing filter. These steps are repeated many times per second in order to render high quality images of private information for each user.

One implementation of the creation of images "A" and "B" manages three areas of the screen: areas seen through either pair of glasses A 66 or pair of glasses B 68 (public information), areas seen only through pair of glasses A 66 (private information of Person A), and areas seen only through pair of glasses B 68 (private information of Person B). Areas seen through either pair of glasses are placed into corresponding areas of image "A" and image "B". Areas seen only through pair of glasses "A" 66 are placed into corresponding areas of image "A" only. Areas seen only through pair of glasses "B" are placed into corresponding areas of image "B" only. If the polarizing effect does not block enough of the opposite image (for example, if the Person A can see a dim image of image "B"), the use of mask patterns may be necessary. In this case, mask patterns are placed into areas of image "B" that correspond to areas seen only through pair of glasses "A", and mask patterns are placed into areas of image "A" that correspond to areas seen only through pair of glasses "B".

The mask pattern is a static, random pattern of black and white pixels designed to obscure the corresponding areas of the opposite image. The design of an appropriate mask depends on the data to be masked, and so requires customization for any given implementation. Typically, a random pattern of black and white blocks is used, where the size of the blocks is adjusted at design-time to maximally mask the opposite image.

FIG. 7 is a flow diagram of the method for generating images according to an embodiment of the present invention. At step 100, the screen is divided into areas seen through either glasses "A" or glasses "B", areas seen only through glasses "A", and areas seen only through glasses "B". At step 102, for each area seen through either glasses "A" or glasses "B", that area's image data is copied into the corresponding area of image "A" and image "B". Next, at step 104, for each area seen only through glasses "A", that area's image data is copied into the corresponding area of image "A". If desired, an appropriate mask is copied into the corresponding area of image "B". Finally, at step 106, for each area seen only through glasses "B", that area's image data is copied into the corresponding area of image "B". If desired, an appropriate mask is copied into the corresponding area of image "A".

Figure 8:
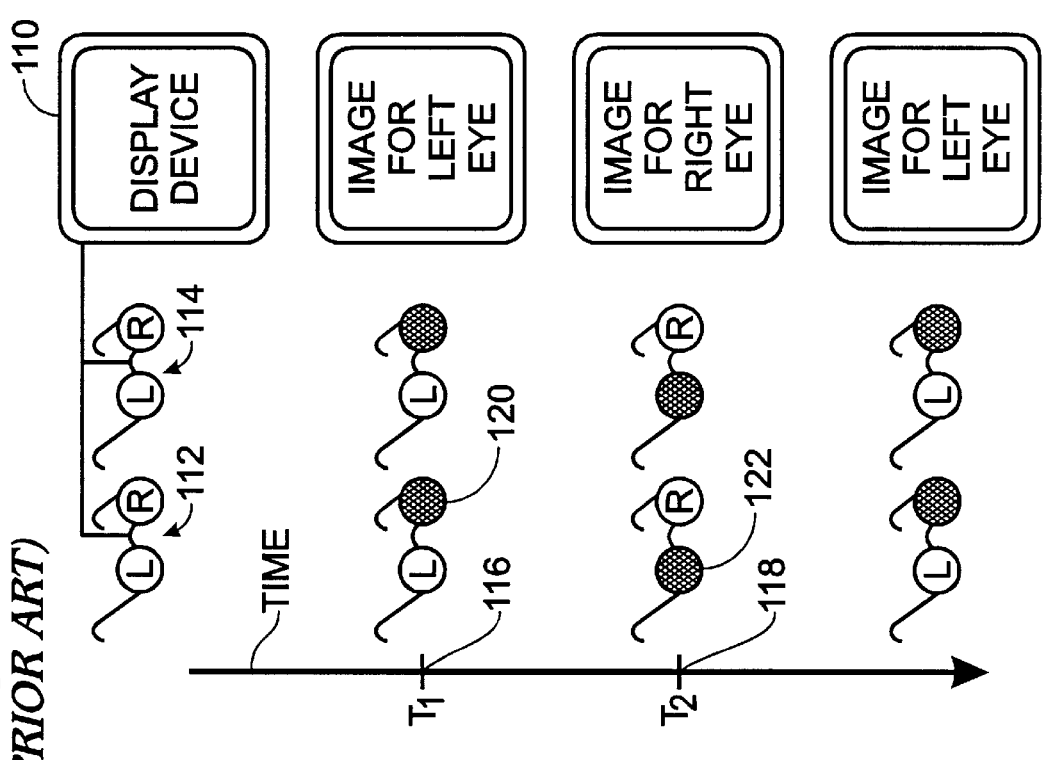
FIG. 8 illustrates the use of shutter glasses to obtain a stereo display (Prior Art)

Another embodiment of the present invention uses shutter glasses. FIG. 8 shows the existing use of shutter glasses for stereo viewing. The display device 110 is connected to at least one pair of shutter glasses 112. In this example, another pair of shutter glasses 114 is also shown connected to the display device. The glasses are constructed of liquid crystal displays (LCDs) that are turned alternately dark or clear in synchrony with the display device such that when the display device shows the image for the left eye's view at time $t_1$ 116, the right lens 120 is dark, and when the display device shows the image for the right eye's view at time $t_2$ 118, the left lens 122 is dark. As time progresses and the images are switched at a high rate (e.g., 120 times per second), the user wearing the shutter glasses appears to see a stereo display on the display device 110. Such shutter glasses are well known in the art. Infrared wireless shutter LCD glasses which work in this embodiment of the present invention are the CRYSTALEYES shutter glasses commercially available from StereoGraphics Corporation of San Rafael, Calif.

Figure 9:
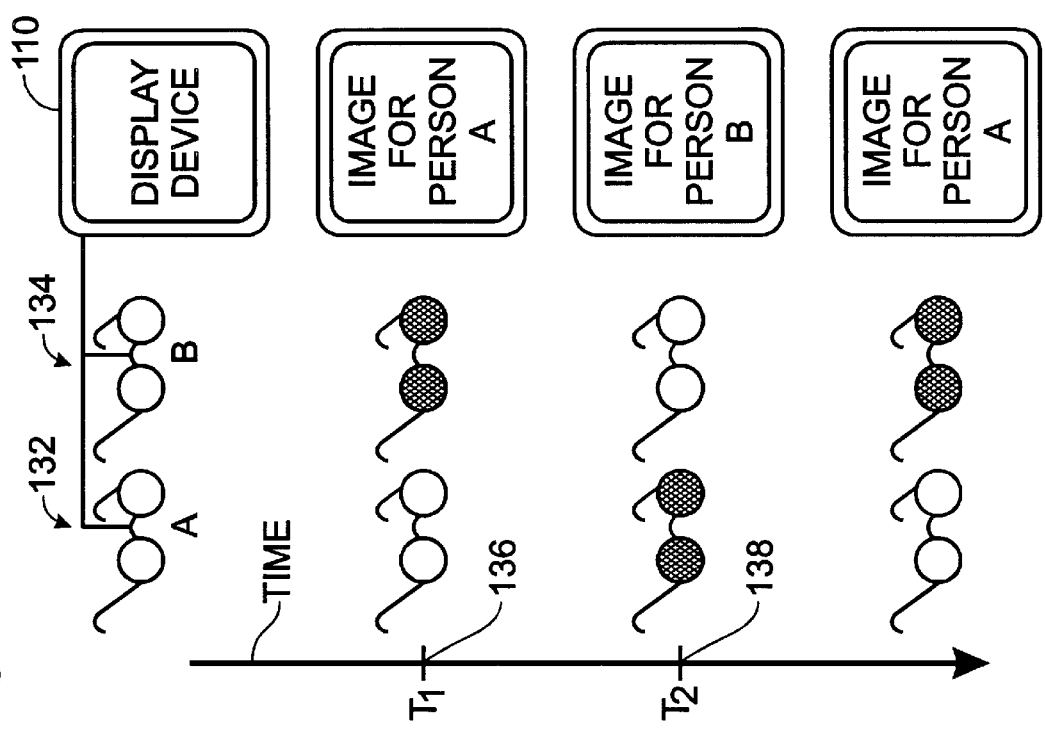
FIG. 9 illustrates the use of shutter glasses according to an embodiment of the present invention.

FIG. 9 shows the shutter glasses system, reprogrammed according to an embodiment of the present invention, so that Person A's left and right glasses 132 are dark simultaneously (instead of alternating) and alternate with Person B's left and right glasses 134 being dark. Now, at time $t_1$ 136 the display device 110 shows the image for viewing by Person A through left and right glasses 132 while Person B's glasses 134 are dark. At time $t_2$ 138, the display device shows the image for viewing by Person B through left and right glasses 134 while Person A's glasses 132 are dark. As time progresses and the images are switched at a high rate, Person A sees one set of displayed information and Person B sees another set of information. In this way, separate displays are shown to two or more users using a single physical display.

Figure 10A:
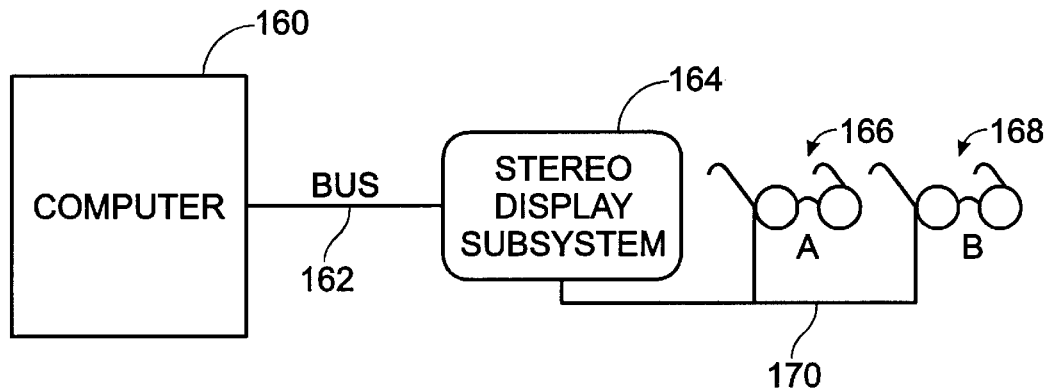
FIGS. 10a and 10b are diagrams of an embodiment of the present invention using shutter glasses.
Figure 10B:
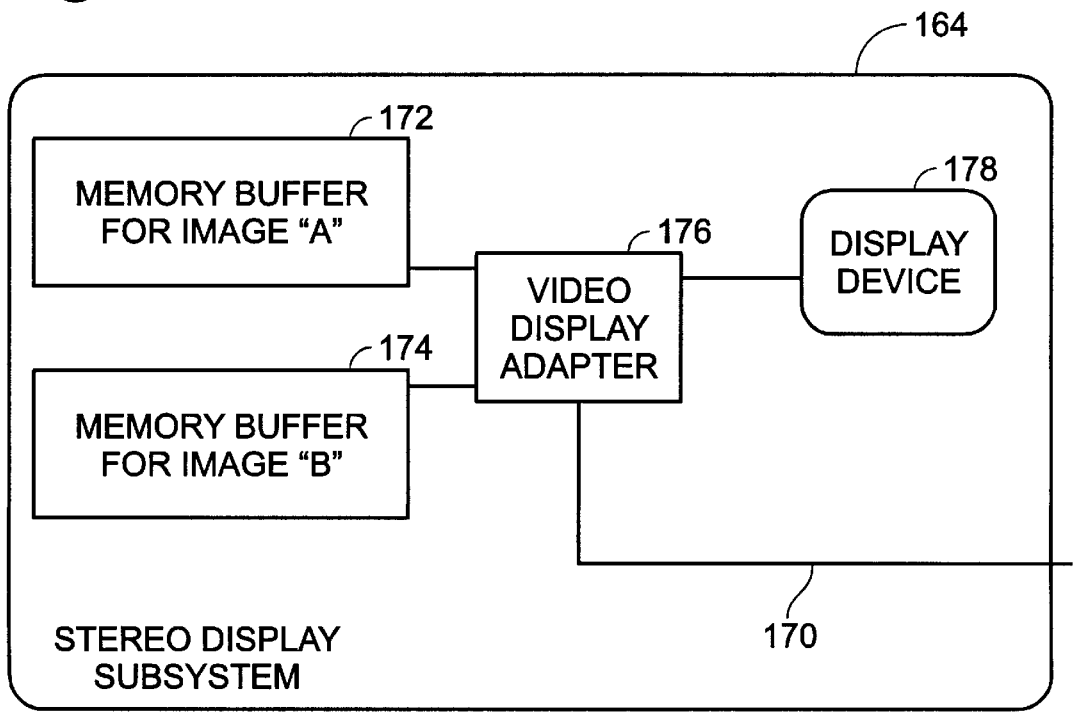

FIGS. 10a and 10b are diagrams of an embodiment of the present invention using shutter glasses. A computer 160 is coupled by a bus 162 to a stereo display subsystem 164. The computer may be any general purpose digital computer such as a personal computer (PC). The two pairs of shutter glasses 166, 168 are driven by a stereo synchronization signal from the stereo display subsystem over line 170, where the shutters in Person A's glasses 166 both open when the stereo synchronization signal indicates that a private image for Person A is being displayed by the stereo display subsystem, the shutters in Person B's glasses 168 both open when the stereo synchronization signal indicates that a private image for Person B is being displayed by the stereo display subsystem, and the shutters in Person A's glasses 166 open and close in opposition to the shutters in Person B's glasses 168. This arrangement is different than the conventional arrangement, which has the left lenses of both pairs of glasses opening and closing at the same time (when an image "A" is being displayed), the right lenses of both pairs of glasses opening and closing at the same time (when an image "B" is being displayed), and the left lenses opening and closing in opposition to the right lenses.

The stereo display subsystem employs a memory buffer for image "A" 172, and a memory buffer for image "B" 174, coupled to a video display adapter 176. The memory buffers store the display data for the separate images for Person A and Person B. Each image includes private information and may also include public information. The video display adapter drives the display device 178 and produces the stereo synchronization signal over line 170. The stereo synchronization signal may be conveyed to the glasses according to well known methods such as through wires or by infrared transmission. The video display adapter interacts with a computer program (not shown) executing on computer 160.

Generation of the images for the embodiment using shutter glasses is the same as is described above in FIG. 7 for polarized glasses.

Figure 11A:
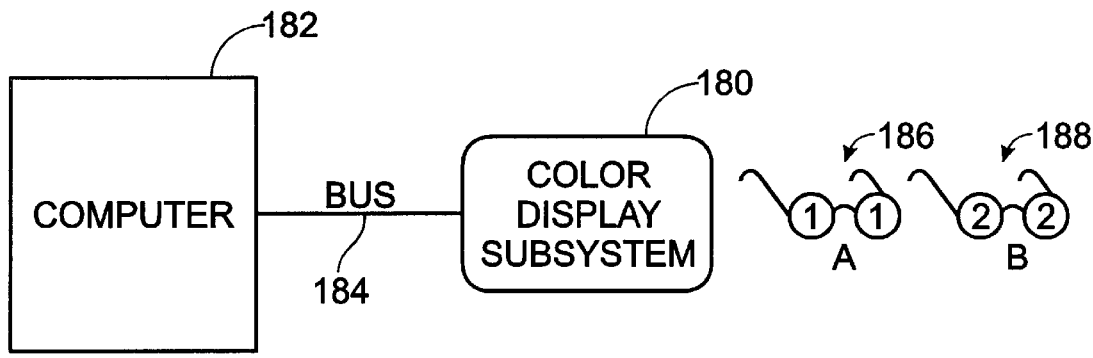
FIGS. 11a and 11b are diagrams of an embodiment of the present invention using color glasses.
Figure 11B:
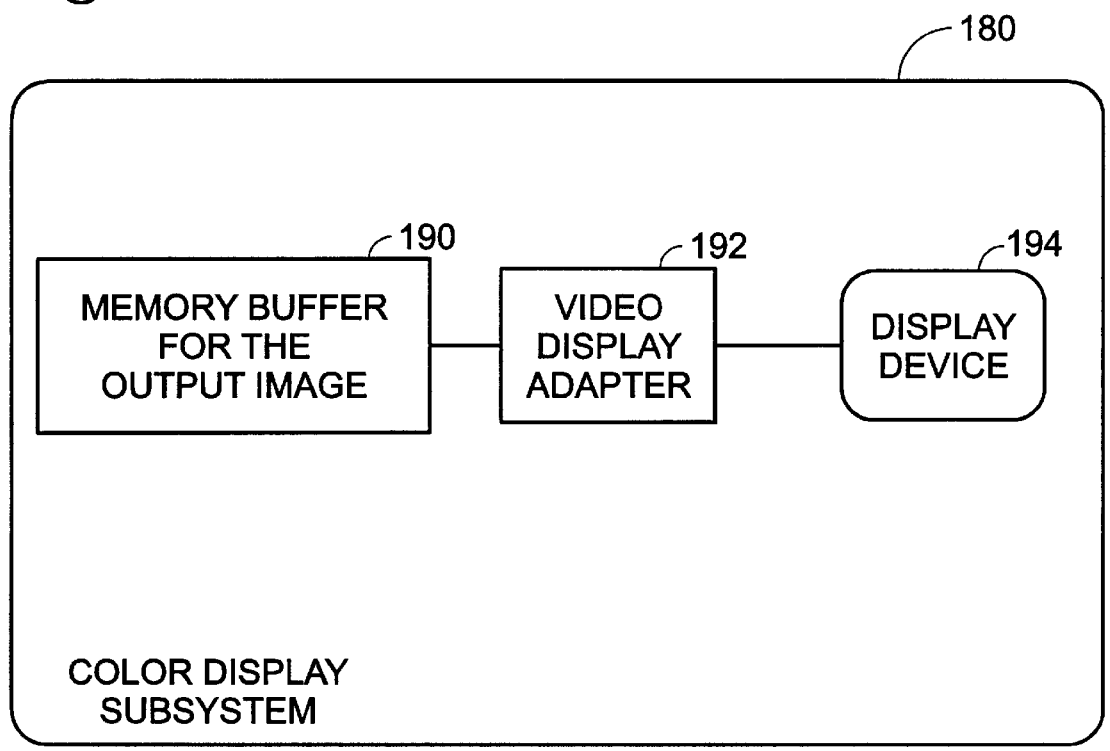

Another embodiment of the present invention uses colored glasses. In this embodiment, a conventional color display subsystem 180 is connected to a computer 182 via a bus 184 as is shown in FIGS. 11a and 11b. Two pair of colored glasses are now used, where glasses "A" 186 are colored in a first color (for example, red) and glasses "B" 188 are colored in a second color (for example, blue). The colors are chosen based on the output of the color display subsystem. In this embodiment, the color display subsystem includes a memory buffer for the output image 190 and a video display adapter 192 for controlling the display of images by display device 194.

The embodiment based on colored glasses operates in the following manner. Four colors are chosen, based on the characteristics of the color display subsystem: color #1, the color of the glass or plastic in colored glasses "A" 186; color #2, the color of the glass or plastic in colored glasses "B" 188; color #3, the display color chosen to transmit minimally through colored glasses "A" and maximally through colored glasses "B"; and color #4, the display color chosen to transmit minimally through colored glasses "B" and maximally through colored glasses "A". The colors, their transmission (for the glasses) and brightness (for the display) are chosen so that the following relationships exist. Color #4 filtered by color #1 produces a color that is close to the color produced by white filtered by color #1. That is, the color for viewing by glasses "B" looks white to the person wearing glasses "A". Color #3 filtered by color #2 produces a color that is close to the color produced by white filtered by color #2. That is, the color for viewing by glasses "A" looks white to the person wearing glasses "B". Further, color #3 filtered by color #1 produces a color that is close to black, and color #4 filtered by color #2 produces a color that is close to black.

Traditional stereo viewing glasses and displays (called "anaglyph" stereo pictures) often use red and blue for colors #1 and #2 (the glasses) and cyan and pink for color #3 and #4 (the display colors).

Figure 12:
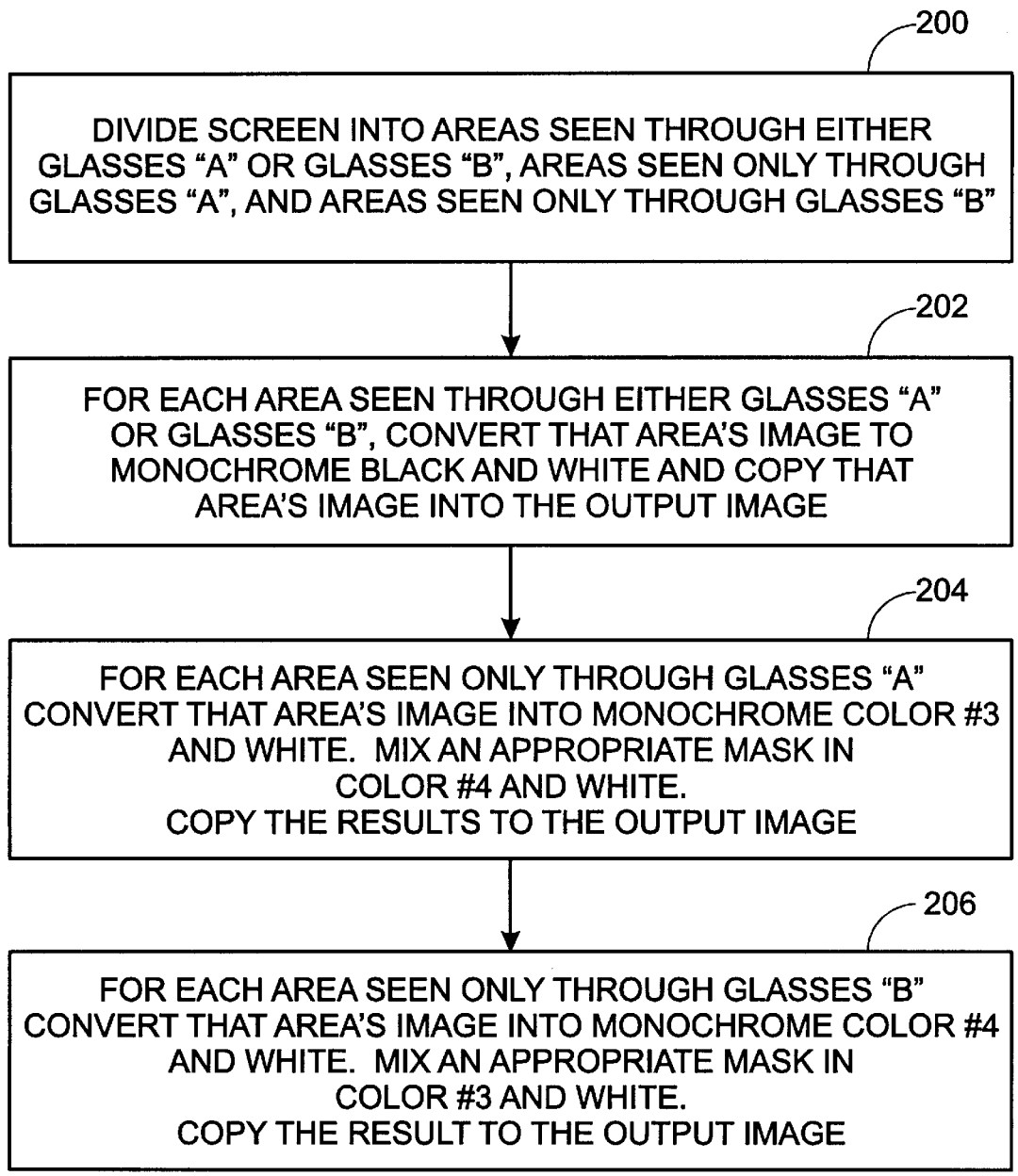
FIG. 12 is a flow diagram of the method for generating images according to another embodiment of the present invention.

A computer program running on the computer 182 creates an output image and transfers it to memory buffer for the output image 190 in the color display subsystem 180. FIG. 12 is a flow diagram of the method for generating images according to this embodiment of the present invention. At step 200, the program divides the output image into areas visible through either pair of glasses "A" 186 or pair of glasses "B" 188, areas seen only through pair of glasses "A", and areas seen only through pair of glasses "B". At step 202, for each area seen through either pair of glasses, that area's image is converted to monochrome black and white and copied to the output image. Next, at step 204, areas seen only through pair of glasses "A" 186 are converted to monochrome color #3 and white, subtractively mixed with a masking pattern of color #4 and white pixels, and copied to the output image. Finally, at step 206, areas seen only through pair of glasses "B" 188 are converted to monochrome color #4 and white, subtractively mixed with a masking pattern of color #3 and white, and copied to the output image.

There are many well-known methods of converting a color image into a monochrome black and white image. One equation for converting a Red, Green, and Blue representation of a color into the corresponding monochrome black and white level is:

level=0.302*RedValue+0.585*GreenValue+0.113*BlueValue

RedValue=level

GreenValue=level

BlueValue=level

Converting a monochrome black and white image to a monochrome color and white image involves linear interpolation between the monochrome color (e.g., color #3) and white. Assuming the range of pixel Red, Green, or Blue values is 0 through 255, and that white is represented by the Red, Green, Blue triple of {255, 255, 255}, one method of conversion is shown below:

RedScale=(255.0−MonoChromColorRedValue)/255.0

GreenScale=(255.0−MonoChromColorGreenValue)/255.0

BlueScale=(255.0−MonoChromColorBlueValue)/255.0

RedValue=level*RedScale+MonoChromeColorRedValue

GreenValue=level*GreenScale+MonoChromeColorGreenValue

BlueValue=level*BlueScale+MonoChromeColorBlueValue

Mask patterns are created as in the other methods described above.

The mixing of a mask and an area of the image is performed as a subtractive (filtering) mix, producing the effect of viewing the image through a glass colored by the mask:

RedValue=(MaskRedValue*RedValue)/255.0

GreenValue=MaskGreenValue*GreenValue)/255.0

BlueValue=(MaskBlueValue*BlueValue)/255.0

When using a color scheme of red, blue, red, and cyan represented by the Red, Green, Blue triples of {255, 0, 0}, {0, 0, 255}, {255, 0, 0}, and {0, 255, 255}, this mixing can be more efficiently performed by a binary AND rather than a multiply:

RedValue=MaskRedValue AND RedValue

GreenValue=MaskGreenValue AND GreenValue

BlueValue=MaskBlueValue AND BlueValue

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of displaying a first set of data private to a first user and a second set of data private to a second, collocated user on a display comprising:

providing two pairs of stereoscopic glasses, a first pair for use by the first user and a second pair for use by the second user;

modifying the first pair of stereoscopic glasses to allow viewing of the display only in a first state and modifying the second pair of stereoscopic glasses to allow viewing of the display only in a second state;

displaying the first set of data to the first user on the display during the first state such that the first set of data is visible by the first user but not visible by the second user;

displaying the second set of data to the second user on the display during the second state such that the second set of data is visible by the second user but not visible by the first user;

displaying a third set of data on the display during the first and second states such that the third set of data is visible by the first and second users; and alternately switching between the first and second states.

2. The method of claim 1, wherein the stereoscopic glasses are polarized glasses, each pair having a first lens and a second lens, and the modifying step includes swapping the second lens of the first pair with the first lens of the second pair.

3. The method of claim 2, further comprising changing polarization of a polarizing filter covering the display to allow viewing of the display by the first user through the first pair of polarized glasses during the first state and to allow viewing of the display by the second user through the second pair of polarized glasses during the second state.

4. The method of claim 3, wherein the polarizing filter is set to first polarization in the first state and second polarization in the second state.

5. The method of claims 4, wherein the first pair of polarized glasses are oriented in a first direction and the second pair of polarized glasses are oriented in a second direction.

6. The method of claim 1, wherein the stereoscopic glasses are shutter glasses, each pair having a first lens and a second lens.

7. The method of claim 6, further comprising sending a signal to the first pair of shutter glasses to allow viewing of the display by the first user through the first pair of shutter glasses during the first state.

8. The method of claims 6, wherein the lenses of the second pair of shutter glasses are dark during the first state.

9. The method of claim 6, further comprising sending a signal to the second pair of shutter glasses to allow viewing of the display by the second user through the second pair of shutter glasses during the second state.

10. The method of claims 6, wherein the lenses of the first pair of shutter glasses are dark during the second state.

11. A method of displaying data private to a first user and data private to a second, collocated user on a display comprising:

provided two pairs of stereoscopic glasses, a first pair for use by the first user and a second pair for use by the second user, the stereoscopic glasses having colored lenses, the first pair having lenses of a first color and the second pair having lenses of a second color;

generating image data including the data private to the first user and the data private to the second user wherein the data private to the second user is to be displayed as a third color which transmits minimally through the first pair of stereoscopic glasses and maximally through the second pair of stereoscopic glasses and the data private to the first user is to be displayed as a fourth color which transmits minimally through the second pair of stereoscopic glasses and maximally through the first pair of stereoscopic glasses; and displaying the generated image data on the display.

12. The method of claim 11, wherein the fourth color filtered by the first color produces a color similar to a color produced by white filtered by the first color.

13. The method of claim 11, wherein the third color filtered by the second color produces a color similar to a color produced by white filtered by the second color.

14. The method of claim 11, wherein the third color filtered by the first color produces a color similar to black.

15. The method of claim 11, wherein the fourth color filtered by the second color produces a color similar to black.

16. The method of claim 11, wherein the first color is red, the second color is blue, the third color is cyan, and the fourth color is pink.

17. The method of claim 11, wherein generating the image comprises:

dividing the display into a first set of areas seen through either the first or second pairs of stereoscopic glasses, a second set of areas seen only through the first pair, and a third set of areas seen only through the second pair;

converting the first set's image data to monochrome black and white and copying the first set's image data into the generated image data;

converting the second set's image data to monochrome third color and white, subtractively mixing a mask pattern in the fourth color and white, and copying results of the conversion and mixing to the generated image data; and converting the third set's image data to monochrome fourth color and white, subtractively mixing a mask pattern in the third color and white, and copying results of the conversion and mixing to the generated image data.

* * * * *